Oct. 27, 1953    W. D. CHILTON    2,656,539
HOG RING CLINCHING TOOL
Filed Dec. 29, 1952    4 Sheets-Sheet 1
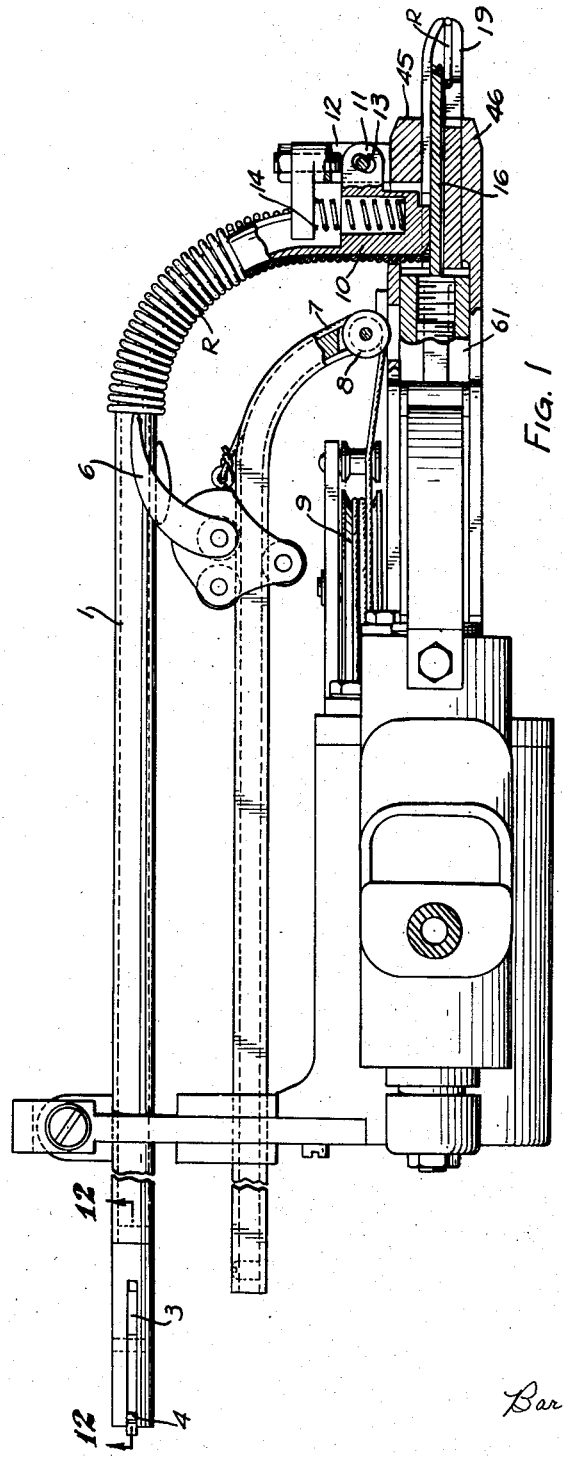
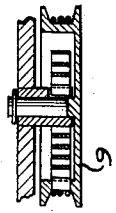
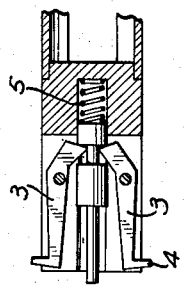
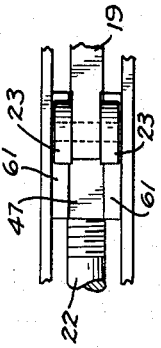
INVENTOR.
WILLIAM D. CHILTON
BY
Barnes, Kisselle, Laughlin & Raisch
ATTORNEYS.

Oct. 27, 1953   W. D. CHILTON   2,656,539
HOG RING CLINCHING TOOL
Filed Dec. 29, 1952   4 Sheets-Sheet 2
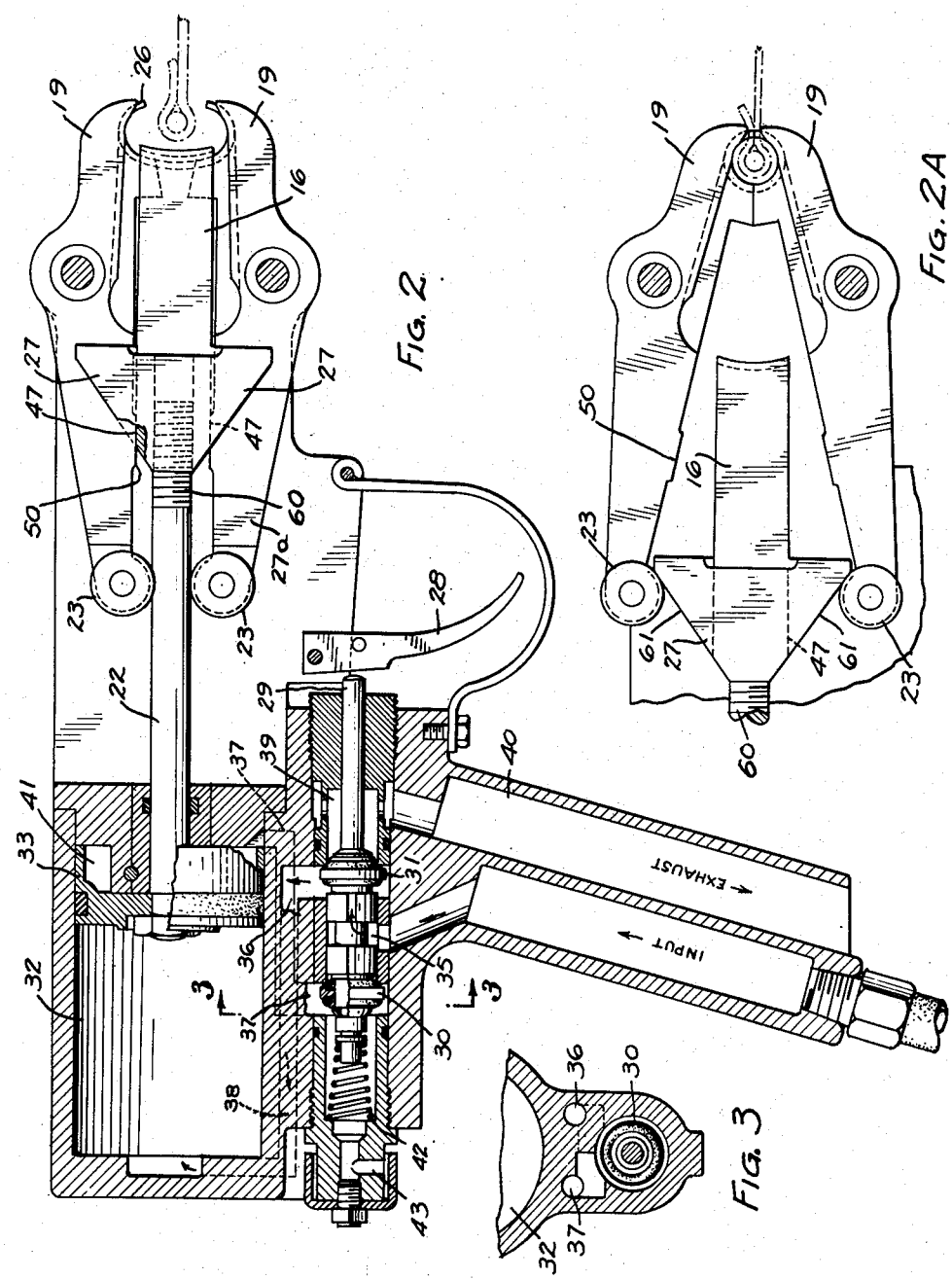
INVENTOR.
WILLIAM D. CHILTON
BY
Barnes, Kisselle, Laughlin & Raisch
ATTORNEYS.

Oct. 27, 1953  W. D. CHILTON  2,656,539
HOG RING CLINCHING TOOL
Filed Dec. 29, 1952  4 Sheets-Sheet 3

INVENTOR.
WILLIAM D. CHILTON
BY
ATTORNEYS.

Oct. 27, 1953　　　W. D. CHILTON　　　2,656,539
HOG RING CLINCHING TOOL
Filed Dec. 29, 1952　　　　　　　　　　　　4 Sheets-Sheet 4

INVENTOR.
WILLIAM D. CHILTON
BY
ATTORNEYS.

Patented Oct. 27, 1953

2,656,539

UNITED STATES PATENT OFFICE 2,656,539

HOG RING CLINCHING TOOL

William D. Chilton, Royal Oak, Mich., assignor to General Motors Corporation, Detroit, Mich., a corporation of Delaware Application December 29, 1952, Serial No. 328,468

9 Claims. (Cl. 1—187)

This invention relates to hog ring clinching tools. It is the object of the invention to provide an improved hog ring clinching tool in which a pusher which takes a ring from the bottom of the stack in the magazine, pushes the ring into the jaws and also operates in connection with the clinching jaws to give the ring a slight preliminary closing for the purpose of causing the jaws to grip the ring and so insure the ring will not drop out while the tool is being maneuvered over the work. The projection of the ends of the ring from the jaws enables the ring to be used to hook over wires or trimming material for pulling the same to a desired position before the ring is clinched over the wire or trimming material.

A further feature of this pusher member is that on the return stroke a cam head integrated with it closes the jaws and clinches the ring.

A further improvement is a pair of latch levers on the end of the magazine for the purpose of preventing the rings sliding back on the magazine and off the end when the tool is moved around.

Referring to the drawings:

Fig. 1 is a top or plan view of the tool.

Fig. 2 is a side elevation of the tool partly in section.

Fig. 2a is a fragmentary side elevation of the tool showing the jaws in clinching position.

Fig. 3 is a section on the line 3—3 of Fig. 2.

Fig. 11 is a detail of the reel for the follower cable.

Fig. 12 is a section on the line 12—12 of Fig. 1.

Fig. 13 is a detail showing the slotted cam head and the two rollers on the tail of each lever to engage the two landings on the cam head.

Hog rings are now used extensively in connection with clinching wires and springs together in cushion seat springs and more particularly for clinching the trimming material to the cushion spring. It is desirable to have power operated clinching jaws. A tool of this kind is described and claimed in the prior Green Patent 2,205,690, but this tool does not have the features that have been enumerated in the preamble to this specification.

Figure 4:
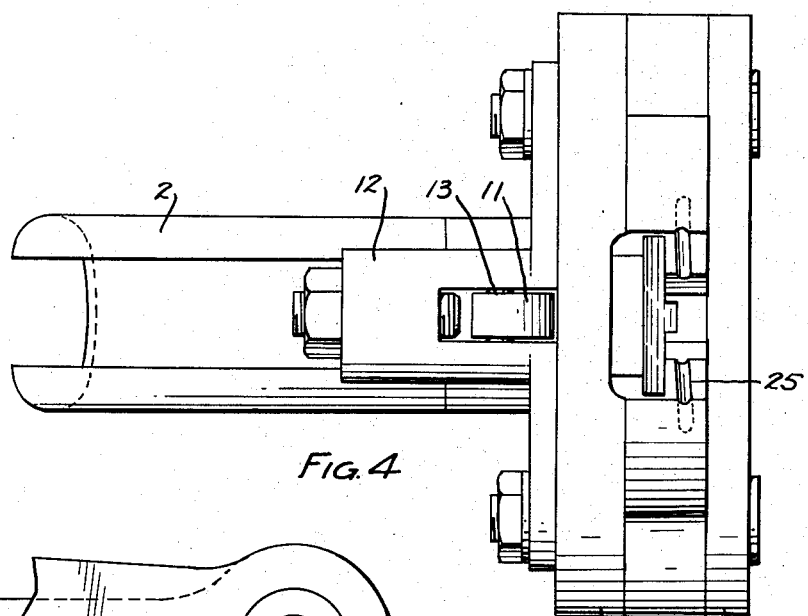
Fig. 4 is a front elevation of the jaws and a part of the magazine.
Figure 6:
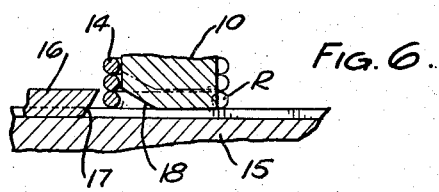
Fig. 6 is a detail section on the line 6—6 of Fig. 5.

The magazine or ring guide is designated 1 and comprises a channel member having turned in flanges 2 (see Fig. 4). The rings are threaded onto the magazine by depressing the latches 3 and nibs 4 that ordinarily project beyond the sides of the magazine to hold the rings from dropping off the end of the magazine. These latch levers are normally projected to the position where nibs will retain the rings on the magazine by means of the spring 5. A follower 6 is pulled up against the end of the column of rings by means of the nylon cable 7 which at one end is attached to the follower and then passes over a sheave 8. The cable then winds on a spring operated spool 9. At the end of the channel like magazine a core or plug 10 is provided to guide the rings into their final position forward of the pusher. This plug 10 has an arm 11 which fastens it to bracket 12 by means of a pin and slot connection 13. This allows the plug to rise and fall to the extent permitted by the pin and slot. A spring 14 pushes the plug 10 down against the bed 15 on which pusher 16 slides (see Fig. 6). Pusher 16 has a chamfered front end 17 which is adapted to take a ring R off the bottom of the column and push it against the lower edge 18 of the plug. This pushes the plug upwardly against the resistance of spring 14 and allows the ring R to be picked off the column and pushed forward as shown in the dotted lines of Fig. 6.

Figure 5:
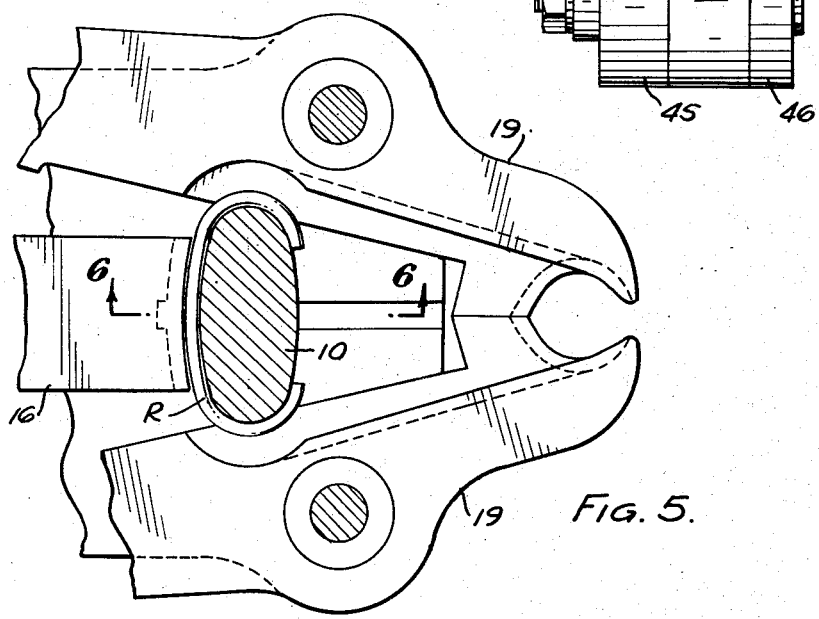
Fig. 5 is a fragmentary side elevation showing the pusher in the process of pushing the ring out from under the column of rings in the magazine.
Figure 7:
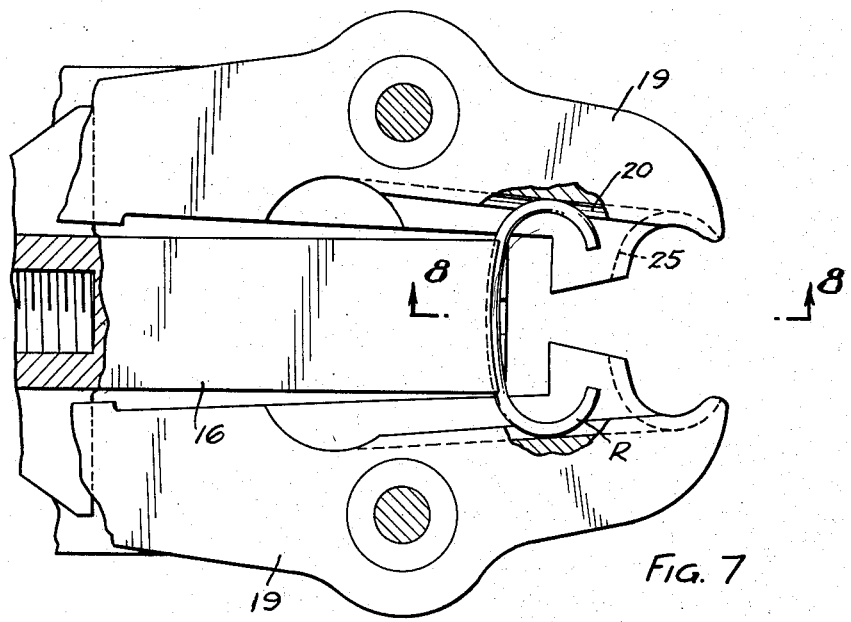
Fig. 7 is a fragmentary side elevation showing the pusher pushing the ring into the jaws located in the maximum open position.
Figure 8:
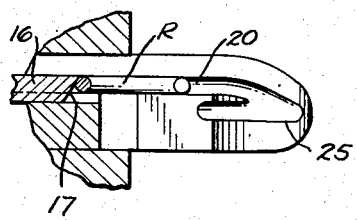
Fig. 8 is a fragmentary section showing the ring being pushed along the upper guide groove.
Figure 9:
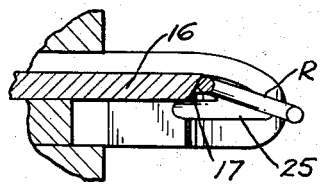
Fig. 9 is a similar view showing the ring being pushed from the upper groove.
Figure 10:
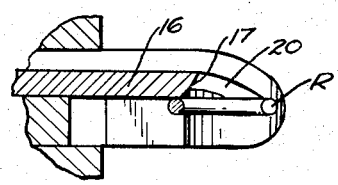
Fig. 10 is a similar view showing the ring snapped into the lower retaining groove of the jaws.

Fig. 5 shows the pusher 16 about to strike the ring R and pick it off the column. Fig. 7 shows the ring pushed into the clinching jaws 19 and into the upper grooves 20 of the jaws (see Fig. 8). The maximum opening of the jaws is shown in Fig. 7. Pusher 16 pushes ring R into the guide groove 20 of the jaws. With the jaws open to the position shown in Fig. 7 the guide grooves converge toward the forward end of the jaws, consequently, as the pusher continues to push the ring forward as shown in Figs. 8, 9 and 10, the ring is given a preliminary closing (but not set) by reason of being squeezed between the walls of the converged grooves. The chamfered end 17 of the pusher pushes the ring forward as nicely shown in Figs. 8 and 9 and then the chamfered end of the pusher rides over the ring as shown in Fig. 10, as the ring reaches the end of the upper guide groove 20. This pushes the ring into the lower set of grooves 25 as shown in Fig. 10. The amount of preliminary closing of the ring will depend on the angle of convergence of the upper grooves 20. This in turn will depend on the spread of the jaws. The amount of closing of the ends of the ring will not be great; usually it can be measured in sixty-fourths of an inch. The resilience of the wire is such as not to take a permanent set at this small closing and thus keep the ring in the jaws.

It will be seen in Fig. 2 that the ends 26 of ring R project inside the jaws 19 and afford a convenient set of hooks to hook onto the work to pull it toward other work to which it is to be united by clinching operations. The final clinching operation is shown in Fig. 2a. This is brought about by the return movement of the reciprocating member which includes the pusher 16 and the cam head or actuator 27 which encounters the needle bearing supported rollers 23 and spreads the clinching levers 19 thereby causing the forward ends of the clinching levers to swing in on the ring together from the position shown in Fig. 2 to the position shown in Fig. 2a. The lower grooves 25 on the ends of the jaws, as shown in Fig. 4, are arranged on a partial helix so that the ends of the ring can pass one another and form a small helix if the ring is clinched on a small piece of work.

The power operation conceivably could be electric, hydraulic or even some form of mechanical operation, but I prefer to use pneumatic power. Referring to Fig. 2, 28 is a trigger by which valve stem 29 may be pushed in to shift the two valves 30 and 31. These valves have rubber gaskets on both ends. Each valve is a double conical valve. Normally spring 42 causes the stem and the trigger 28 to be in the forward position. Fig. 2 shows the pneumatic apparatus with the trigger 28 at rest. The air pressure comes into the air inlet of the handle, passes into the space between the wing type of piston guide and then through passage 36 to space 32 behind piston 33. This keeps the piston in the forward position and the pusher 16 in the outward position behind a ring 26.

The piston rod screws into the cam head or actuator on the threads 60 (see Fig. 2). When the trigger is pulled back, air from the intake passageway passes forward of valve 30 into passage 37 to chamber 41 at the front of the piston. Air behind the piston exhausts through passageway 38, chamber 39, thence forward of valve 31 down through exhaust passage 40 in the handle. Fig. 2 shows the piston about to begin its back stroke which brings the cam head or actuator 27 backwardly between needle bearing rollers 23 to clinch the fastener as shown in Fig. 2a.

When the trigger 28 is released, spring 42 pushes the valve set forward. Then air enters passage 36 at the rear of valve 31, passes to space 32 behind piston 33 and pushes piston 33 forward. The air forward of the piston exhausts through passage 37, thence to the rear of valve 30 and out exhaust port 43, at the end of spring chamber. This forward thrust of the piston as already explained causes the pusher to pick a ring off the lower end of the stack in the magazine, then push it forward into the jaws to give it a preliminary closing. The ends 26 project from the jaws as shown clearly in Fig. 2, and they can be used to hook or grasp part of the work and pull it to the desired position for clinching.

This application is a continuation in part of my prior application entitled "Hog Ring Clinching Tools," filed September 4, 1947, Serial No. 772,172, now abandoned. However, in this new tool the interchangeable plate of the prior application, which was used to regulate the opening of the jaws, has been eliminated. The ends of the levers have raises 50 which encounter the bottom of the slots 47 in the cam head to stop the swing of the levers and establish the maximum opening of the jaws. The rollers, instead of being supported by balls are supported by needle bearings.

In the tool of the prior application, the pusher was considerably offset from the piston rod and consequently there was a tendency for the pusher to be distorted and wear the parts and sometimes jam in its guides. I have so revised and reconstructed the tool that now the pusher is not offset but is in a central position and in direct alignment with the piston rod which gives it the thrust. This will be seen by examining Fig. 1. This is accomplished by means of having the bracket and arms which guide and support the jaws arranged one arm 45 at one side of the pusher (above in Fig. 1) and the other arm 46 below the jaws in Fig. 1. The cam head 27 is slotted at 47 so that the cam head straddles the tail portion of the levers 27a that have the jaws, see Fig. 2, and each lever has two rollers 23, one on each side of the end of the lever, one roller engaging one land 61 of the slotted cam head and the other roller engaging the other land 61 of the slotted cam head. This gives better balance to the parts and minimizes clamping, jamming and wear. The bottoms of the slots are engaged by raises 50 on the levers to control the opening of jaws 19 and establish the jaws' arrangement of width less than the length of the ring to give the preliminary closing to jam the ring in the jaws.

What I claim is:

1. In a hog ring clinching tool the combination of a pair of clinching jaws, means for arresting the clinching jaws in a position of maximum opening, each of the jaws having a guiding groove, the said grooves converging forward when the jaws are in position of maximum opening, and the convergence for part of the distance that they lie opposite each other producing a spacing of the grooves less than the initial length of the rings, and a positive pusher for pushing the ring into that part of said converging grooves of the jaws wherein the spacing of the grooves is less than the initial length of the rings, to thereby give the rings a preliminary closing.

2. In a hog ring clinching tool the combination of a pair of clinching jaws, means for arresting the clinching jaws in a position of maximum opening, each of the jaws having a guiding groove, the said grooves converging forward when the jaws are in position of maximum opening, and the convergence for part of the distance that they lie opposite each other producing a spacing of the grooves less than the initial length of the rings, and a positive pusher for pushing the rings into that part of said converging grooves of the jaws wherein the spacing of the grooves is less than the initial length of the rings to thereby give the rings a preliminary closing, the said jaws being pivoted levers of the first order and the said means for holding the jaws in position of maximum opening being a plate which encounters the power ends of the levers.

3. In a hog ring clinching tool, the combination of a pair of levers of the first order with grooved clinching jaws on the ends, a pusher for taking the ring and pushing it into the clinching portions of the jaws on the forward stroke of the pusher, power means with a rod for reciprocating the pusher and a slotted cam head in alignment with the rod on the pusher for striking the power ends of the levers for separating the same and causing the jaws to move together in clinching the hog ring in the rearward movement of the pusher, said slotted cam head straddling the rear portion of the levers, and the bottom of the slots stopping the levers to control the maximum opening of the jaws.

4. In a hog ring clinching tool, the combination of a pair of levers of the first order having grooved clinching jaws on their ends, a pusher for taking the ring and pushing it into the clinching portions of the jaws on the forward stroke of the pusher, power means with a rod for reciprocating the pusher and a slotted cam head on the pusher in alignment with said rod for striking the power ends of the clinching levers for separating the same and causing the jaws to move together on the hog ring in the rearward movement of the pusher, said slotted cam head straddling the rear portions of the levers and the bottom of the slots of the cam head stopping the levers to control the maximum opening of the jaws and a roll on each side of the lever for engaging lands of the cam head on both sides of the slot.

5. In a hog ring clinching tool, the combination of a pair of levers having clinching jaws and two pairs of grooves, one pair being converging guide grooves on the ends of the levers and the other being a pair of curved clinching grooves on the jaw ends of the levers, and in a plane offset from the plane of the guide grooves, means for forming a positive stop for the opening of the jaws and the drawing together of the levers, a pusher for pushing the hog ring through the converging guide grooves to give it a preliminary closing and thence into the clinching grooves, and means for actuating the levers after the partially closed ring has reached the clinching jaws to thereby complete the closing of the ring.

6. In a hog ring clinching tool, the combination of a pair of levers having clinching jaws and two pairs of grooves, one pair being converging guide grooves in the ends of the levers and the other being a pair of curved grooves on the jaw ends of the levers, and in a plane offset from the plane of the guide grooves, means for forming a positive stop for the opening of the jaws and the drawing together of the levers, a pusher for pushing the hog ring through the converging guide grooves to give it a preliminary closing and thence into the clinching grooves, and means on the return of the pusher for engaging the levers to operate the clinching jaws to complete the closing of the ring.

7. In a hog ring clinching tool, the combination of a pair of levers having clinching jaws and two pairs of grooves, one pair being converging guide grooves on the ends of the levers and the other being a pair of curved grooves on the jaw ends of the levers, and in a plane offset from the plane of the guide grooves, means for forming a positive stop for the opening of the jaws, a pusher for pushing the hog ring through the converging guide grooves to give it a preliminary closing and thence into the clinching grooves, and means for actuating the levers after the partially closed ring has reached the clinching jaws to thereby complete the closing of the ring, said means comprising a cam on the pusher which encounters the ends of the levers on the return of the pusher after the pushing operation.

8. A hog ring clinching tool comprising, in combination, a pair of clinching jaws, a reciprocable member including a pusher for taking the ring and pushing it into the clinching jaws on the forward stroke of the member, the reciprocable member also including an actuator operating the clinching jaws on the rearward stroke of the member to close the jaws and clinch the ring therein, and power means for reciprocating the member, the power means having a normal position of rest at the end of the forward stroke of the member.

9. A hog ring clinching tool as recited in claim 8 in which the clinching jaws define a pair of grooves converging in the direction of the forward stroke of the pusher to a portion having a spacing less than the initial length of the rings, and the forward stroke of the pusher is of such extent as to force the ring into the said portion with the ends of the partly closed ring extending from the clinching jaws.

WILLIAM D. CHILTON.

References Cited in the file of this patent
UNITED STATES PATENTS

| Number | Name | Date |
|---|---|---|
| 2,174,152 | Curtiss | Sept. 26, 1939 |
| 2,205,690 | Green | June 25, 1940 |